US012744679B2

(12) United States Patent
Sharma et al.

(10) Patent No.: US 12,744,679 B2
(45) Date of Patent: Sep. 22, 2026

(54) MANAGING UNIQUE SECRETS IN DISTRIBUTED SYSTEMS

(71) Applicant: Amazon Technologies, Inc., Reno, NV (US)

(72) Inventors: Param Sharma, Haymarket, VA (US); Todd Cignetti, Ashburn, VA (US); Trevor Freeman, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 444 days.

(21) Appl. No.: 17/947,957

(22) Filed: Sep. 19, 2022

(65) Prior Publication Data

US 2024/0097918 A1 Mar. 21, 2024

(51) Int. Cl.

*H04L 9/32* (2006.01)
*H04L 9/40* (2022.01)
*H04L 67/10* (2022.01)

(52) U.S. Cl.

CPC ............ *H04L 9/3268* (2013.01); *H04L 9/321* (2013.01)

(58) Field of Classification Search

CPC ... H04L 9/3268; H04L 9/321; H04L 63/0823; H04L 67/10
See application file for complete search history.

(56) References Cited

U.S. PATENT DOCUMENTS 9,960,923 B2 5/2018 Zombik
10,063,382 B1 8/2018 Mehta et al.
2004/0144840 A1* 7/2004 Lee .................. G06Q 20/40975 235/380
2009/0210703 A1* 8/2009 Epstein ................... H04L 9/006 713/157
2011/0078304 A1* 3/2011 Lee ..................... H04L 63/0823 709/224
2014/0282922 A1* 9/2014 Iwanski ................ H04L 63/062 726/5

(Continued)

OTHER PUBLICATIONS

International Search Report and Written Opinion issued Sep. 20, 2023 in PCT Application No. PCT/US2023/067611.

*Primary Examiner* — Lesa M Kennedy
(74) *Attorney, Agent, or Firm* — Hogan Lovells Cadwalader US LLP

(57) ABSTRACT

Approaches presented herein relate to the management of secure secrets in a distributed environment. In particular, various embodiments provide for the management of unique digital identities across multiple regions, where each region can include its own certificate authority. While these certificate authorities may operate independently, they can be part of a multi-primary system where unique identities and keys are stored redundantly across environments. In the event of a failure of a certificate authority in one region, another certificate authority in another region can continue security and authentication management, without a need to issue new identities or change operation of any of the regions. Parties to secure communications, such as application containers, can each receive their own unique identity which can be shared across various regions to allow related tasks (e.g., certificate issuance or revocation) to be performed identically from any of those regions.

20 Claims, 10 Drawing Sheets

(56) References Cited

U.S. PATENT DOCUMENTS

| | | | | |
|---|---|---|---|---|
| 2014/0359281 | A1* | 12/2014 | Saboori | H04L 9/3263 713/156 |
| 2017/0012967 | A1* | 1/2017 | Holloway | H04L 63/0823 |
| 2018/0287804 | A1* | 10/2018 | Geisbush | H04L 63/0442 |
| 2023/0269099 | A1* | 8/2023 | Medvinsky | H04L 9/3247 713/158 |

* cited by examiner

Requestor (A)
202

Region A CA
204

Region B CA
206

Recipient (B)
208

Request Certificate

Authenticate and Provide Certificate Including Signed Unique ID

Provide Cert for Unique ID

Provide Cert/Unique ID

Communicate Using Certificate

Region A CA becomes unavailable

Cert Expires

Request New Cert.

Authenticate and Provide Certificate Including Signed Unique ID

Provide New Certificate Including Signed Unique ID

Communicate Using New Certificate

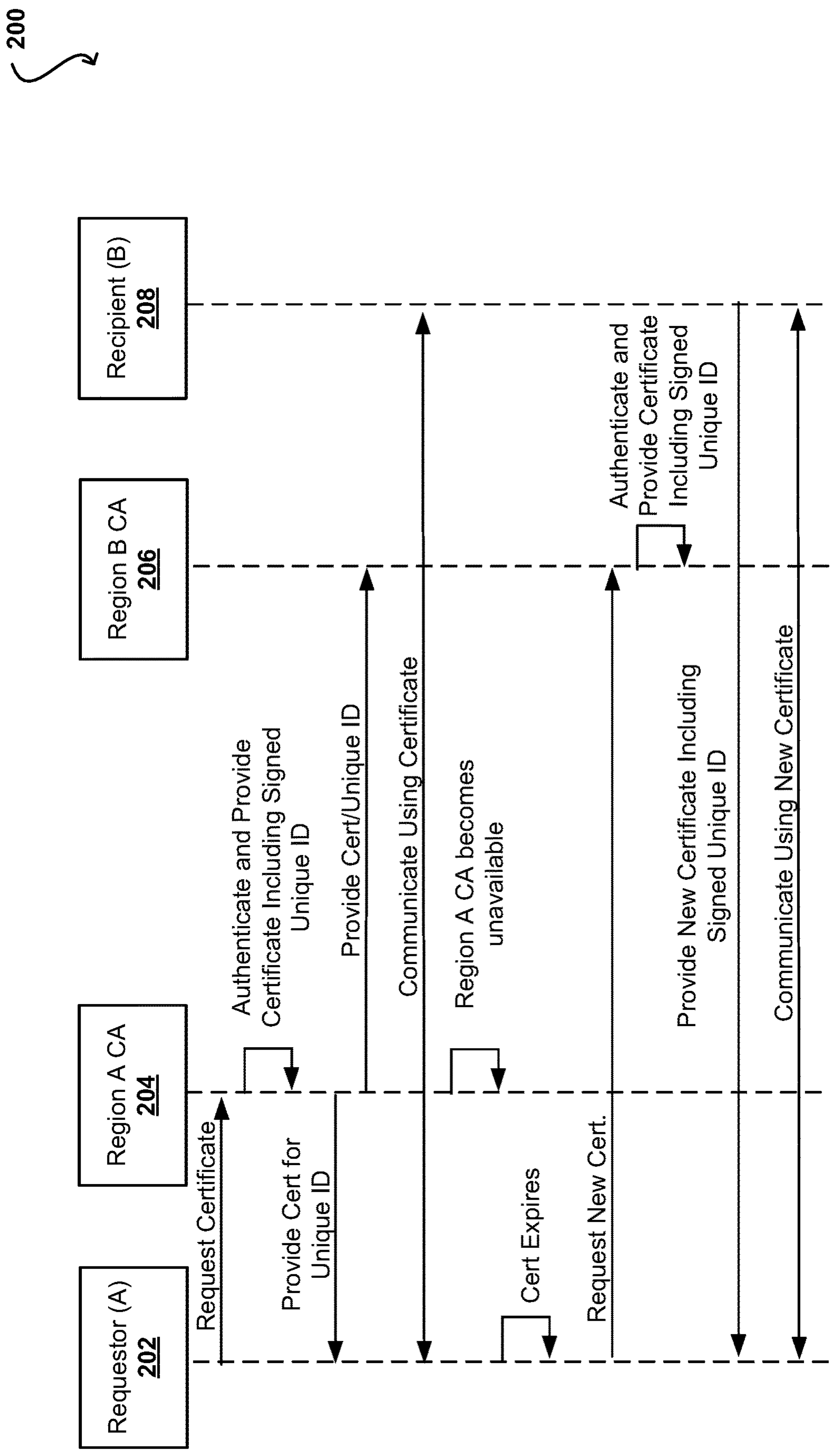

FIG. 2A

Requestor (A) 202

Region A CA 204

Region B CA 206

Recipient (B) 208

Request Certificate

Authenticate and Provide Certificate Including Signed Unique ID

Provide Cert for Unique ID

Provide Cert/Unique ID

Communicate Using Certificate

Region A CA becomes unavailable

Request Revocation

Revoke Certificate

Container Manager

Container: Application package 3 (602)

Primary Region: North America West

Replication Regions: (604)

Africa North
Africa South
Asia East
Asia South
Australia
EMEA
North America East Security Policy: Shared Secure B (606)

Revocation Policy: Revocation 3 (608)

Create | Cancel

MANAGING UNIQUE SECRETS IN DISTRIBUTED SYSTEMS

BACKGROUND

In various networked environments, entities can communicate securely by utilizing unique identities that are assigned to those entities, to ensure that a communication is received from, and delivered to, only intended entities for the communication. In order to provide for security of these unique identities, these secure digital identities can be backed by cryptographic keys and provided by a certificate authority or other secure token authority. It might be the case that entities for these communications are located in different regions, which each have their own certificate authority. Such an approach can result in the assignment of the same identity to different entities in different regions, which can result in collisions or errors in communications as these identities are no longer guaranteed to be unique. Further, if a region experiences problems with availability this may create problems performing related tasks, such as to revoke certificates or issue new certificates.

BRIEF DESCRIPTION OF THE DRAWINGS

Various embodiments in accordance with the present disclosure will be described with reference to the drawings, in which:

FIGS. 2A and 2B illustrates example task flows for issuing certificates, and revoking a certificate, for establishing secure communications in a multi-region environment, in accordance with various embodiments.

DETAILED DESCRIPTION

Approaches described and suggested herein relate to the management of secure secrets in a distributed environment. In particular, various embodiments provide for the management of unique digital identities across multiple regions, where each region can include its own certificate authority, or other secure token authority. While these certificate authorities may operate independently, they can be part of a multi-primary system where unique identities and keys are stored redundantly across environments. In the event of a failure of one certificate authority in one region, another certificate authority in another region can continue tasks relating to at least security and authentication management, without a need to issue new identities or change operation of any of the regions. In at least one embodiment, a certificate authority in one region can receive a request from a container, or other requesting party ("requestor") to a secure communication, and can generate a unique identity for that container. This unique identity can be shared with all regions in which this identity is to be redundant, such as by providing a transaction with a serial number that is dependent at least in part upon the region from which the transaction was originated, in order to ensure that transaction identities are unique both within and across regions. When a certificate needs to be issued or revoked, for example a redundant certificate authority in any redundant region can perform that action using the same unique identity.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
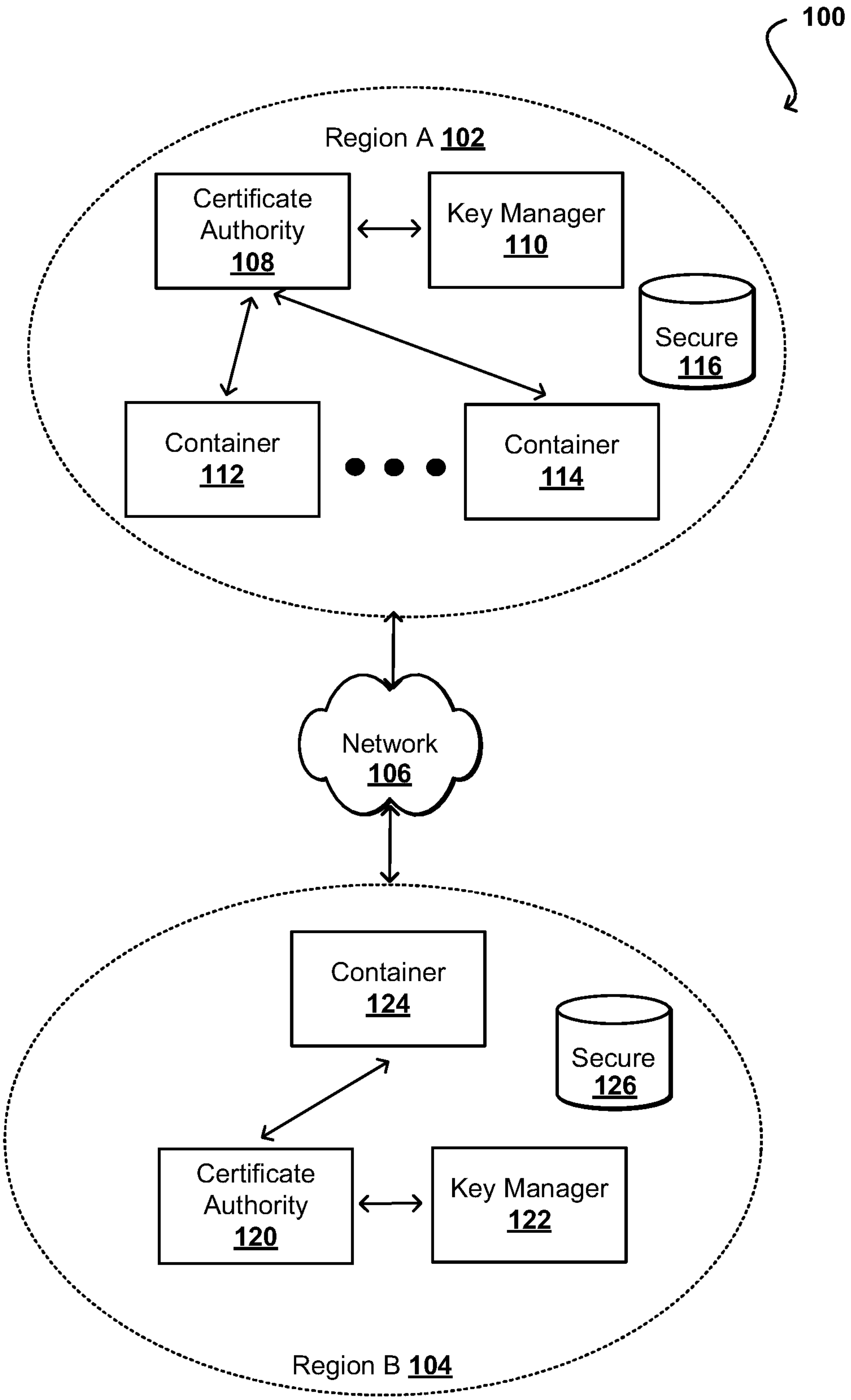
FIG. 1 illustrates an example networked environment in which aspects of various embodiments can be implemented in accordance with various embodiments.

FIG. 1 illustrates an example networked environment 100 where there are digital and/or computing resources in at least two separate regions, here region A 102 and region B, communicatively connected by at least one network 106. In this example, there may be various electronic resources located in each region, as may include servers and databases connected by network components such as routers, load balancers, and switches, as discussed in more detail elsewhere herein. There may be resources, such as applications or compute instances, that may be initiated in these regions. In this example, this may include one or more application containers 112, 114, 124 (e.g., Docker containers) in each region, where individual containers can provide execution environments for respective applications, or different instances of a same application, as may execute on behalf of different users or entities. Although containers are used as a primary example herein, it should be understood that various other types of electronic or computing resources (e.g., virtual machines, computing services, or other requestors) can request to have unique identities issued, revoked, and managed as well using approaches such as those presented herein.

In many instances, these containers or other resources (including physical or virtual resources, or resource instances) may attempt to communicate with other resources or recipients. In many instances, it may be desirable to ensure that these communications are secure, and are delivered from a verifiable source to an intended recipient. In this example system, this can include assigning each of these containers, or other such resources, a unique identity. Unique identities enable a communication to be properly delivered to an intended recipient, and enable a recipient to authenticate a source from which that communication was sent. To help to ensure that a resource or entity does not attempt to impersonate a resource by generating or obtaining a copy of the unique identity, the unique identity can be generated using a protected and verifiable secret, such as a cryptographic key. In this example, each region 102, 104 may include a key manager 110, 122, or distributed hardware security service, which stores and provides these keys (or other secrets such as secure tokens and the like) for resources in the respective environment. In some embodiments, key managers may also store keys for resources in other regions, such that each key manager contains copies of all keys, or at least those keys that may be used for communications with one or more entities, resources, or communication participants in that environment.

As mentioned, each region 102, 104 may also include a secure token authority, such as a certificate authority 108, that can generate, issue, revoke, and manage certificates and unique identities for individual resources. A certificate authority 108 in a given region, such as region A 102, can generate a random, pseudorandom, or selected value string, such as a numerical string of 128 or 256 bits in length, and then sign or encrypt that numerical string with a respective cryptographic key (or other secure secret). The certificate authority can both generate and manage these unique identities, such as by providing the unique identity to the respective resource, such as container 112 or 114, and storing that unique identity for use in subsequent tasks.

In existing systems, there is a certificate authority in each relevant region, such as certificate authority 108 in region A 102, and a certificate authority 120 in region B 104. The certificate authorities in different regions may communicate, but each certificate authority is responsible for generation and management of unique identities for its respective region. As used herein, a region may refer to any logically or geographically separated regions that might have separate management, access, or privileges, as may relate to different countries, cities, or data centers, etc. A problem with such an approach, however, is that if a given region experiences a problem, failure, or availability issue, or if a certificate authority in one region experiences such an issue, there may be problems with performing tasks with respect to those digital identities. In some embodiments a certificate authority in another region 120 may be used for recovery, but that certificate authority would have to generate a new digital identity, which may result in issues such as dropped communications, or may cause confusion once the original certificate authority 108 is available again and tries to use the old unique identity. Various other issues can arise as well, such as those discussed and suggested herein.

Approaches in accordance with at least one embodiment can attempt to provide a certificate authority that can function as a single entity or identity. For example, even though there may be a first instance 108 of a certificate authority in region A 102 and a second instance of a certificate authority 120 in region B 104, these instances would work together and function as a single certificate authority, such that if one instance 108 experiences a problem or failure another instance 120 can continue management responsibilities for all unique identities, such as to issue new certificates or revoke existing certificates, regardless of the certificate authority or region in which that unique identity was originally created.

The ability for another certificate authority to act is not limited to a failure situation, as there may be various situations where a certificate authority in another region may perform a management task with respect to a unique identity. Since all related certificate authority instances can function in parallel as a single authority, there may be various criteria that may be used to decide which authority to act, as may relate to location, network load or conditions, resource capacity, and the like. An entity may also then communicate with a certificate authority in any region, such as a region where that entity is located, regardless of where a respective unique identity was originated, or where a resource associated with that unique identity is located. And the digital identities generated in one region will be of an identical type to those that are generated in other regions, without risk of overlap or collision, unlike prior systems where individual certificate authorities in different regions may also have different characteristics.

In at least one embodiment, the cryptographic material to be used to generate the unique identities is to be made concurrently available in multiple locations. This can be provided in various implementations using a distributed key manager 110, such as a distributed hardware security module or service that can securely manage items, such as security tokens, digital certificates, or encryption keys, for multiple regions, while also making those keys available in those multiple regions (except where restricted). Such a service can also allow security policies to be defined that can be applied consistently across applications and services in these various regions 102, 104. As illustrated, there may be instances of a key manager 110, 122 in each region, but these instances may function together as a single entity that operates across regions. It should be mentioned that although two regions are illustrated in FIG. 1 for simplicity, there may be any number of regions of similar or different configurations, with similar or different components, in similar or different locations within the scope of various embodiments presented herein.

A certificate authority, or other secure token authority, can also provide management services that support cryptographic primitives, such as digital identities, across multiple regions in a distributed manner. Such an approach can allow a digital identity that was created in Region B 104 to be recognized and managed seamlessly in another region, such as Region A 102, just as if the digital identity had been generated by a certificate authority instance 108 in Region A 102. A distributed certificate authority may then need to communicate or replicate information about a new, modified, or invalidated digital identity to all other regions for which this information is managed, as well as to acknowledge such action(s). Such information has to be synchronized across regions with minimal latency, and using a mechanism that prevents duplication or collisions of digital identities or other managed secure information or items.

In at least one embodiment, a certificate authority can work together with a key manager 110, to manage distributed keys or other secure items or elements, and can also work with a distributed database, or database service, that can provide secure database instances 116, 126 across different regions 102, 104. In one example, the distributed database service can be a service such as DynamoDB from Amazon.com, Inc., which can provide a fully managed, serverless, key value database that can be used to execute high-performance applications at various scales. A certificate authority service can thus use a key manager 110, such as KMS from Amazon Web Services, Inc. (AWS), to allow for cryptographic keys to be available and managed across multiple regions, and a distributed database such as DynamoDB to allow data to be replicated across these regions. A certificate authority 108 can leverage such as key manager 110 and secure distributed database 116 to allow keys and data to be replicated and managed across regions, which can then be used by a certificate authority when, for example, managing digital identities for use in communications within, between, or outside managed regions. As illustrated, there may be multiple instances of a certificate authority 108, 120 across different regions, but one of these instances may be designated as a primary instance that is ultimately in charge of management of these other instances, with the other instances serving as secondary instances, while in some embodiments each instance may function as a primary instance, or there may be an additional instance (not illustrated in FIG. 1) that may be inside or outside a given region that may be tasked as a primary authority, among other such options.

In at least some embodiments, a certificate authority can utilize secure transactions to communicate information about digital identities to different regions. A transaction may relate to creation of a digital identity in a given region, or the revocation of a digital identity in a region, among other such actions. Such transactions may occur independently in different regions, but need to be reconciled across all regions such that valid digital identities can be used for communications, or other such actions, in any managed region, and all regions are aware that a digital identity that has been revoked can no longer be trusted in any of these regions. In at least one embodiment, each transaction can be assigned a unique "serial number," or other such transaction identity, that will be unique to that transaction. This serial number can be a combination of a unique identity for an entity, such as a container, as well as region-specific information. In this way, transactions that relate to the same unique identity would not collide as their serial numbers would differ based on being generated in different regions, and thus having different region-specific information represented in those serial numbers. The region-specific information can also be managed such that the information is also unique within a region, such as by using a monotonically increasing counter or other such approach that guarantees that each serial number issued from within a region is different from any other serial number issued from within that region. Such an approach can guarantee uniqueness within a region as well as across regions, where each serial number identifies a unique transaction.

Each certificate authority in a multi-primary embodiment can perform various management tasks, with results of those tasks then being coalesced into a single distributed repository. This can include tasks such as auditing and accounting, in addition to basic key and identity management. Such a single distributed repository can help the system to function as a single system, and can enable outside entities to interact with independent instances in different regions as if they were operating with a single, distributed instance.

In at least one embodiment, these unique digital identities can be used to uniquely identify various services, such as AWS services. As illustrated in FIG. 1, unique identities can also be generated for individual application containers 112, 124 to assist in managing secure communications for those containers. This can include use of these unique digital identities for secure communications, as may utilize cryptographic protocols such as transport layer security (TLS) or secure socket layer (SSL) protocols. Digital certificates can be provided for the containers to the transaction in order to authenticate, for example, a source of the communication, where the digital certificate may contain information such as a unique identity, identity of a trusted certificate authority that vouches for the authenticity of the certificate, and a corresponding public encryption key, among other such options. A recipient container may confirm the validity of the certificate using a certificate authority in the same region, even if the certificate was generated in a different region. Secure communications can then be sent between these containers based, at least in part, upon the respective unique identities. In various embodiments, such secret management can be used for both public and private communications. For example, an entity can provide keys for public SSL websites, where the appropriate domain name service (DNS) name is provided and the entity needs to be able to prove that the entity owns that DNS name.

FIG. 2A illustrates an example task flow 200 that can be performed in accordance with various embodiments. In this example, a requestor 202 (e.g., a container or application) can be created or instantiated in a first region A. That requestor 202 can communicate with an instance of a certificate authority 204 in the same region A (or potentially a different region, based upon factors such as availability or load). The contacted certificate authority 204 can use information associated with the request to authenticate the requestor 202. The certificate authority 204 can generate a unique identity for the requestor 202, and can provide a certificate corresponding to the unique identity to the requestor 202. In at least one embodiment, this can involve the certificate authority 204 endorsing received identifying data and providing a certificate corresponding to a unique identity for that requestor 202. The certificate authority 204 can also generate and send a transaction to a certificate authority 208 in another region (B) to indicate the creation of a new valid unique identity and issuance of a certificate. In this example, the requestor 202 may then attempt to initiate (or send) a communication to a recipient 210 in the other region (B). The recipient 210 receiving the communication request (or an end client on which the requestor is executing and on which the certificate is installed) can engage in secure communications as long as the recipient 208 trusts the certificate. The recipient 210 can then process, or otherwise act on, the received communication. Each requestor (or other component, service, or process for which a unique identity is to be provided) can undergo a similar process, allowing for secure communications between parties, such as authenticated components, services, or processes, whether inside the same region, in a different region, or outside a given region. A multi-primary certificate authority as presented herein can help these requestors and recipients to know that the identities being exchanges are secure and authentic. The containers can trust the certificate authority to function as a broker in this process, to create and manage these digital identities.

In this example, it may be determined that the certificate authority 204 in region A becomes unavailable. The certificate issued by this first certificate authority 204 may also expire. The requestor 202 can then request a new certificate, corresponding to the same unique digital identity, be issued by a second certificate authority 206 in region B. The second certificate authority 206 can use information associated with the request to authenticate the requestor, and can use the same unique digital identity to generate and issue a new certificate, which can then be used for secure communications (or other secure operation) between the requestor and recipient.

Figure 2B:
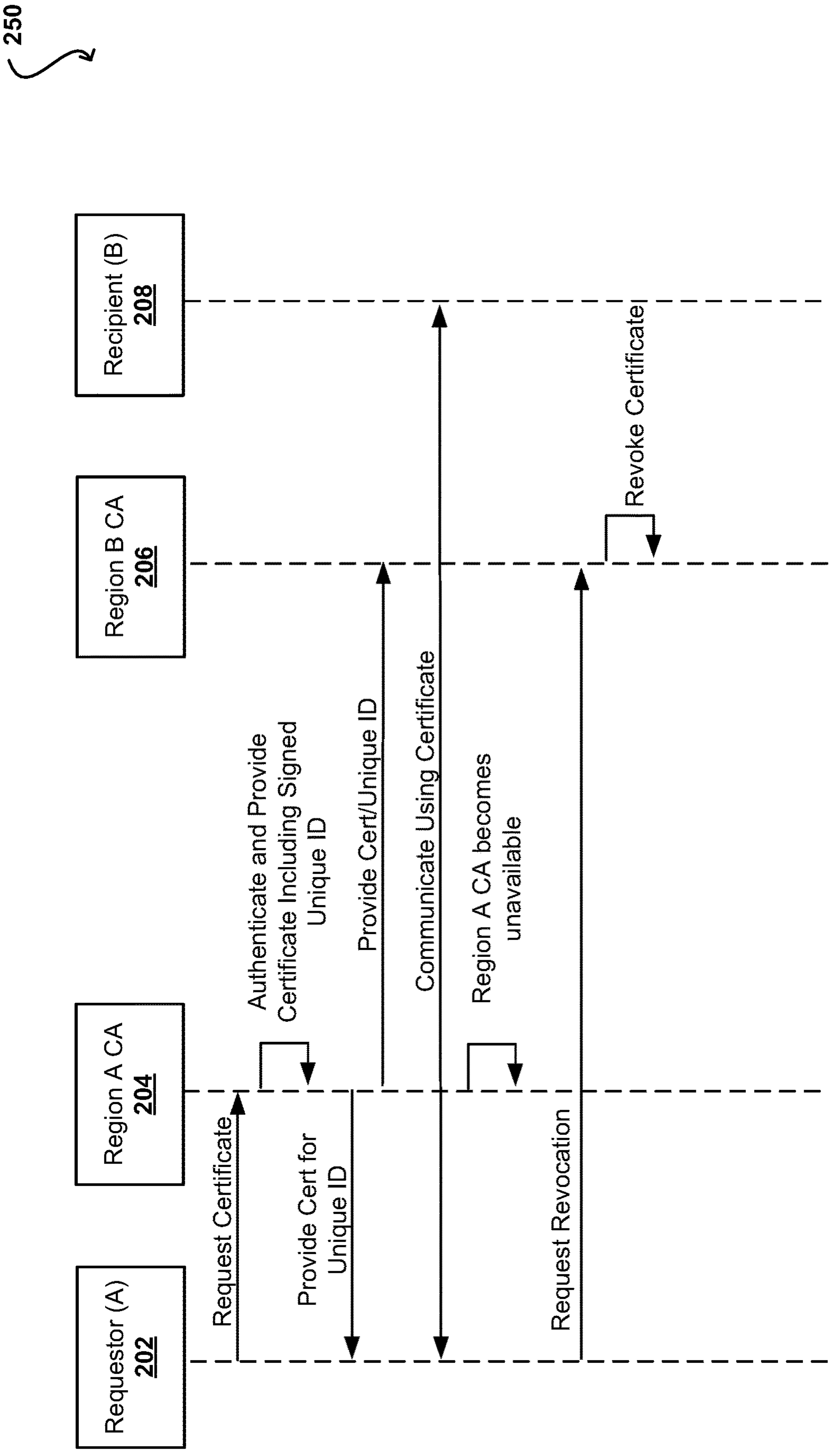

FIG. 2B illustrates a similar flow, but where a requestor needs to revoke a certificate. In this example, a requestor 202 in region A again requests and a certificate from a certificate authority 204 in Region A, as described with respect to FIG. 2A. In this example, it is determined that this first certificate authority is no longer available when the requestor 202 wants to revoke the certificate. In this case, since the certificate authorities in all redundant regions have copies of the unique identities, the requestor 202 can request revocation from a second certificate authority 206 in region B, which can then revoke the certificate even though it was issued by a certificate authority in another region.

As mentioned, keys and unique identities, and any related information, can be stored in each managed region. In some embodiments, a user may be able to specify which region(s) a given key, identity, certificate, or token is to be stored or made available, or which region(s) should not store or make that data available. In at least one embodiment, this data can be replicated between regions such that each region has a complete record of anything relevant that has occurred with respect to a given unique identity. As mentioned, since this can be performed using a multi-primary implementation, this can include any creation, modification, or invalidation performed by any certificate authority in any managed region. Since the certificate authorities in the various regions operate independently but consistently, there is no downtime or unavailability if one region goes down or experiences a failure, etc. These digital identities can operate independently but can all be created and endorsed in the same way, such that they appear to have come from the same source or instance even though they may have been generated by different certificate authorities in different regions. Any of these managed regions can support and perform multiple operations for these digital identities independent of the region in which they were created. Such an approach can provide for complete flexibility and redundancy over this process between, and among, regions, as there are no differences between identities created in different regions, and all regions have access to those identities so that one certificate authority can continue operation and management of an identity created in another region if that other region experiences a failure, with no loss of, or delays in, service. Such an approach can provide for high availability and redundancy in addition to disaster recovery and other such tasks.

In at least some embodiments, references relating to unique identities may need to be translated between regions. For example, since each region will be able to have an endpoint corresponding to a unique identity, there may need to be a mechanism for ensuring that a connection is made to an endpoint in a specific region. In one embodiment, each reference may be scoped by the appropriate region, or may contain region-identifying or region-associated information. Since an object created in region A will also have its existence replicated to region B, the reference to the object can have a component that is region-specific, such that references can have region values that can be switched to indicate the appropriate region for a communication or action. Such an approach enables each region to have the same information and objects, but allows communications to be directed to a specific region where appropriate. Instances of the same object can then be referenced in different and specific regions.

In at least one embodiment, a private certificate authority customer can be provided with an ability to obtain multi-region certificate issuance and revocation ability. Such an ability to host certificate authorities in multiple regions allows various tasks to be performed even in the event of a security incidence, including tasks such as revoking certificates, generating certificate revocation lists (CRLs), providing online certificate status protocol (OCSP) responses, or issuing new certificates.

In some systems, log data may also be replicated between regions. In other systems, event logs may be regional, such that if a given unique identity is available in multiple regions, then each region may store log data for the usage of that unique identity (or associated key) within that region, but these separate logs may then be available globally such that data may need to be aggregated from multiple regions for auditing or other such actions. A customer could generate such an audit report from any region in which there was a certificate authority instance.

Figure 3:
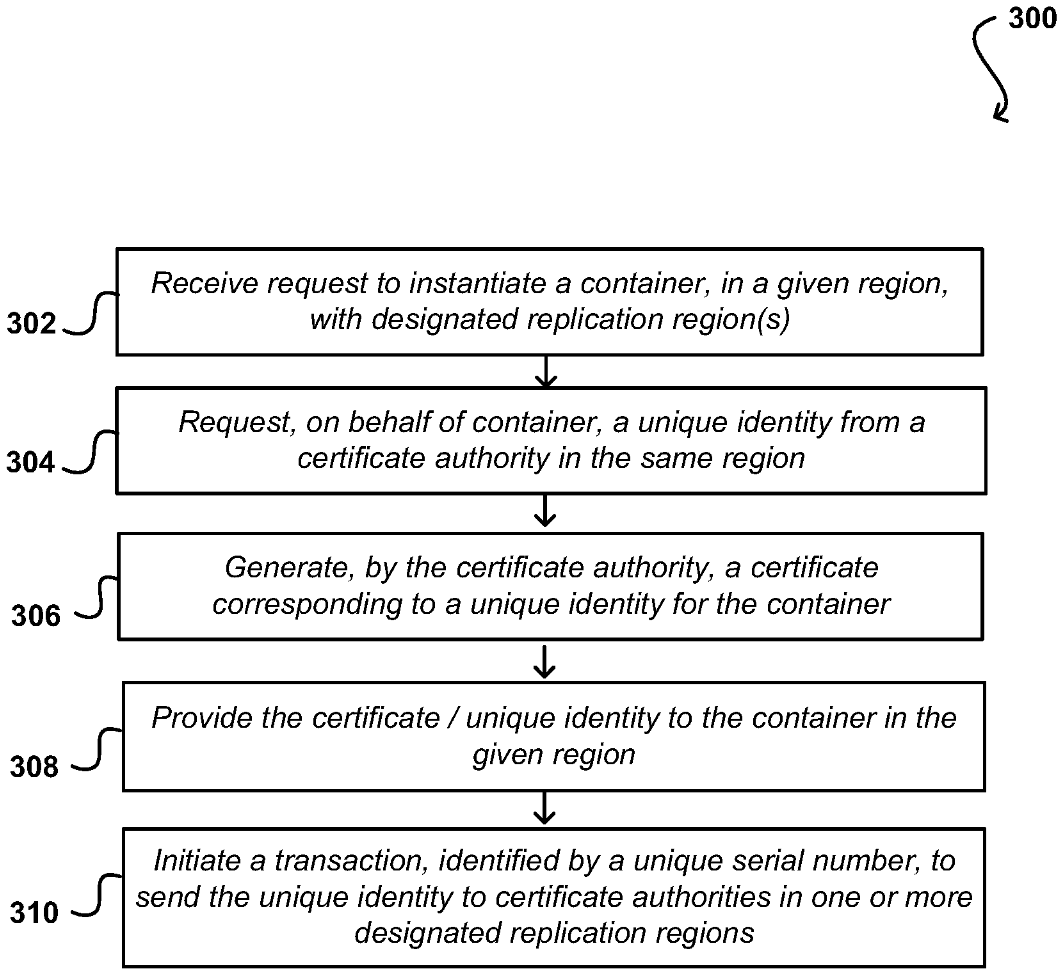
FIG. 3 illustrates an example process for generating and distributing a unique identity for a container in a multi-region environment, in accordance with various embodiments.

FIG. 3 illustrates an example process 300 for creating and sharing a unique identity that can be utilized in accordance with various embodiments. It should be understood that for any process presented herein that there may be additional, fewer, or alternative steps performed in similar or alternative orders, or at least partially in parallel, within the scope of the various embodiments unless otherwise specifically stated. Further, although this example process will be discussed with respect to containers and certificates, it should be understood that other secrets may be used with other types of components, applications, services, systems, components, processes, or entities as well within the scope of the various embodiments. In this example, a request can be received 302 to instantiate a container, where that request can specify regions where security information for that container should be replicated. This request can be received through a console, application programming interface (API), or other such mechanism. In at least one embodiment, the region in which the request is received can be designated as the primary region. The container can contact a certificate authority, in a region in which the container was instantiated, in order to request 304 a certificate corresponding to a unique identity. The certificate authority can generate 306 a unique identity, such as a random (or pseudorandom or non-random) value string that is 128 or 256 bits in length, that is signed or encrypted using a respective cryptographic key (or other secure secret). The certificate authority can provide 308 this unique digital identity/certificate to the container for use in performing tasks such as initiating secure communications between an end client, corresponding to the requestor, and a recipient. The certificate authority can also initiate 310 a transaction, identified by a unique serial number, to send to other certificate authorities in other identified replication regions, where the transaction indicates the creation and association of the unique digital identity with the container in the initiating region. In this way, the certificate authorities in the other replication regions can function independently but in a coordinated manner with respect to the unique identity, enabling tasks for the container to be managed out of any of these replication regions. In at least some embodiments, a user may be able to update a list of replication regions at any time, such that the certificate authority keys, unique identities, or other such information can be copied or deleted from various regions as appropriate. In at least one embodiment, information about these regions may be stored to a distributed database, such that the information is available in each of the relevant regions. A user can then issue a request or perform a task, such as to revoke a certificate, from any of these replication regions.

Figure 4:
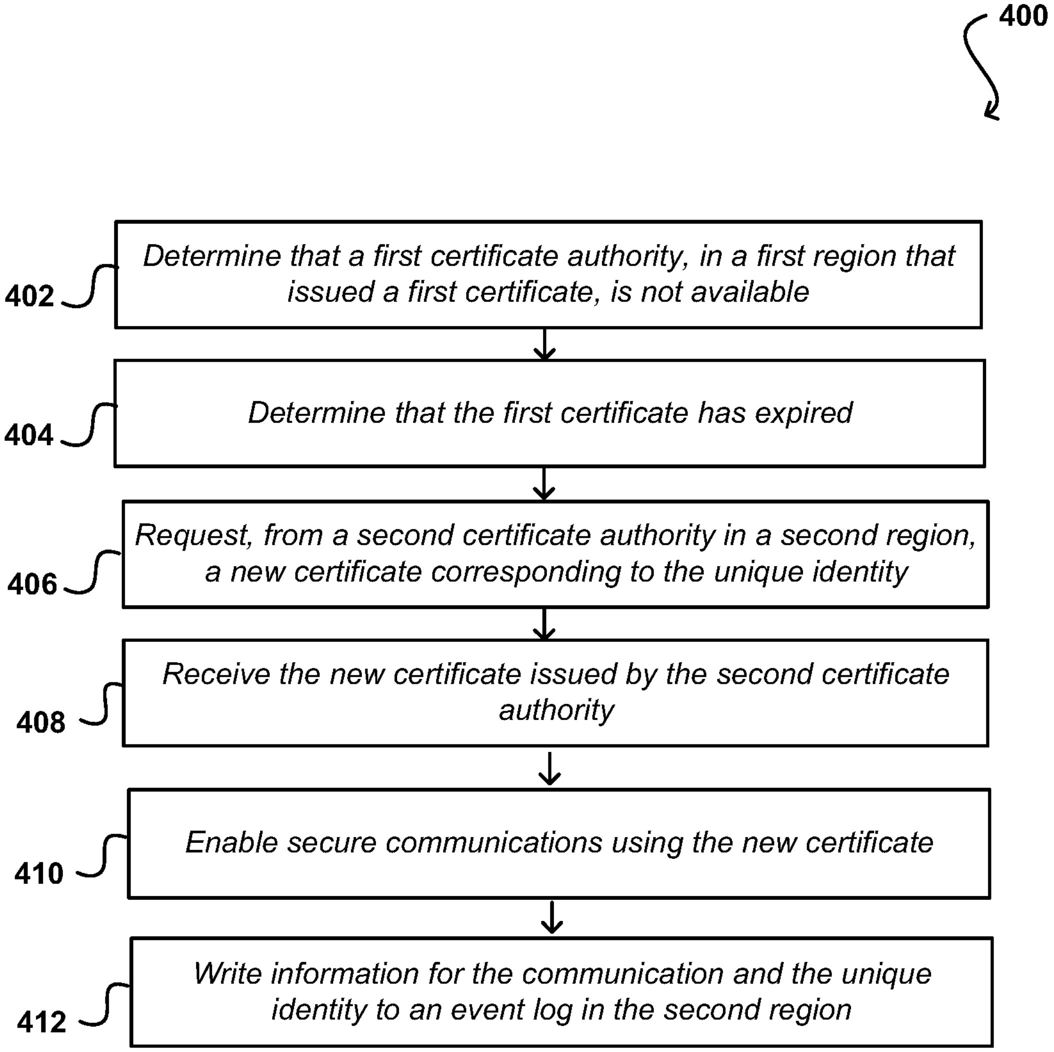
FIG. 4 illustrates an example process for issuing a new certificate associated with a unique identity, in accordance with various embodiments.

FIG. 4 illustrates an example process 400 for managing secure communications between regions that can be utilized in accordance with various embodiments. In this example, a first container (or other requestor) in a first region attempts to initiate secure communication with a second container (or other recipient) in a same or second region, using a unique identity generated for the first container in the first region. It is determined 402 that a first certificate authority, which issued a first certificate for the requestor, is not available. It can also be determined that this first certificate has expired. The first container can then request 406, from a second certificate authority in a second region that is a redundant CA for this requestor, a new certificate corresponding to the same digital identity. The new certificate can be issued by, and received 408 from, the second certificate authority in the second region. Secure communications between the first container and the second container can be enabled 410 using the newly issued certificate. The recipient can process the secure communication as appropriate. In addition, the certificate authority in the second region can write 412 information for the unique identity and new certificate issuance to an event log stored in the second region but available in the first region, along with any other region to which the unique identity is to be replicated.

Figure 5:
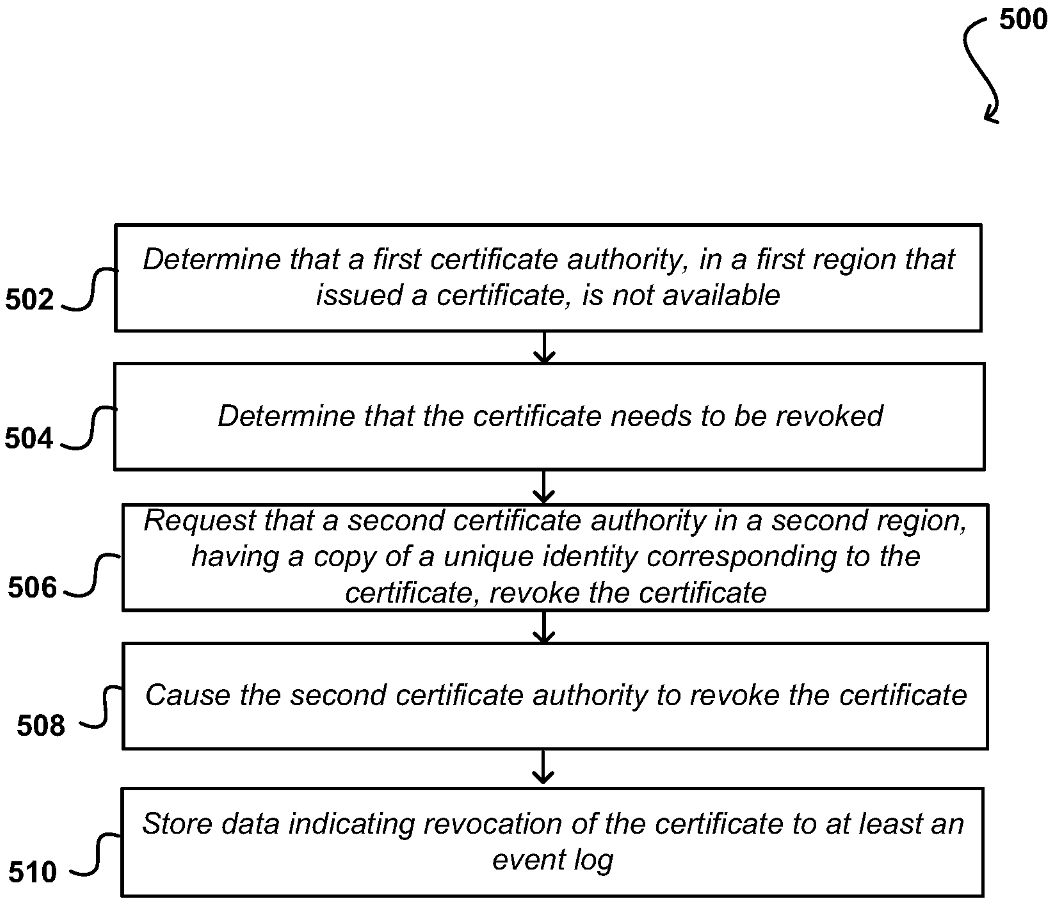
FIG. 5 illustrates an example process for revoking a certificate in the event of an unavailability of a certificate authority in a specific region, in accordance with various embodiments.

FIG. 5 illustrates an example process 500 for managing revoking a certificate in the event of a failure that can be utilized in accordance with various embodiments. It should be understood that a "failure" is just one reason for such a process to be utilized as discussed in more detail elsewhere herein. In this example, it can be determined 502 that a first certificate authority in a first region, that issued a certificate corresponding to a unique digital identity, is not available. It can also be determined 506 that the certificate needs to be revoked. A requestor of an end client, for example, can request 506 that a second certificate authority, in a second region and having a copy of a corresponding unique digital identity, revoke the certificate. As the second certificate authority has the digital identity and can function as a redundant certificate authority, the second certificate authority can be caused 508 to revoke the certificate. Data indicating the revocation can then be stored 510 to at least an event log associated with the second certificate authority, and may also be sent to any other redundant certificate authority with respect to the digital identity.

Figure 6:
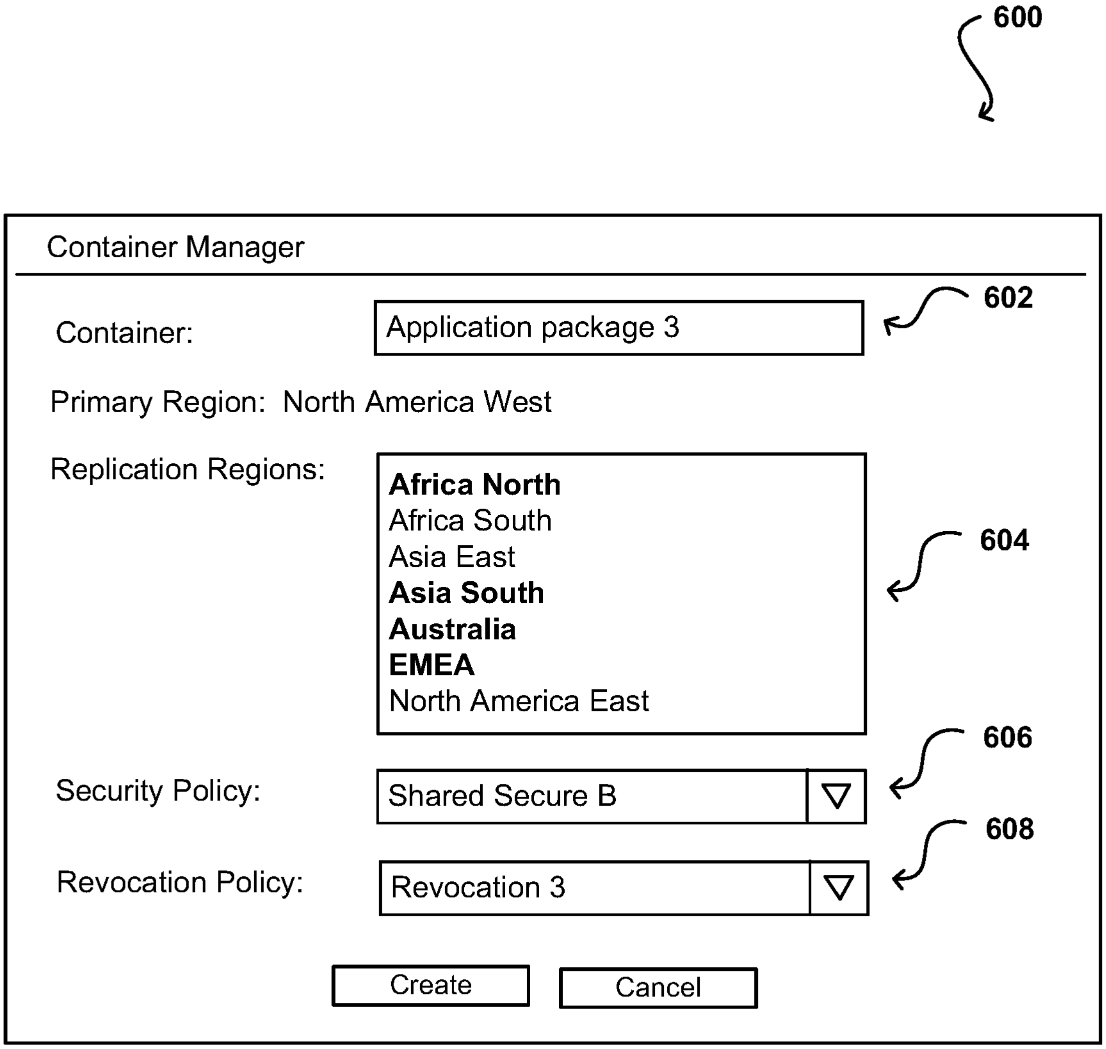
FIG. 6 illustrates an example interface for managing aspects of a container, in accordance with various embodiments.

FIG. 6 illustrates an example user interface 600 that can be used to create a container in accordance with various embodiments. In this example, a user can indicate a new container to create in a current primary region, here the region in which the console or interface is hosted. The user can designate a name 602 or identity for the container, and can potentially specify aspects (not shown) such as an application to be hosted in the container, as well as related libraries, files, and the like. In this example, an option 604 allows the user to indicate the region(s) to which security information for this container is to be replicated, where a user may be able to select not to replicate, select one or more of the replication regions, or select all available replication regions. The interface may also provide at least one option 606 enabling the user to specify one or more security aspects for the container, such as to a security policy to apply. The interface may also include one or more options 608 for enabling a user to specify one or more revocation policies to be applied. Various other parameter values or settings can be specified through such an interface as well, such as at least some of those discussed or suggested herein.

Figure 7:
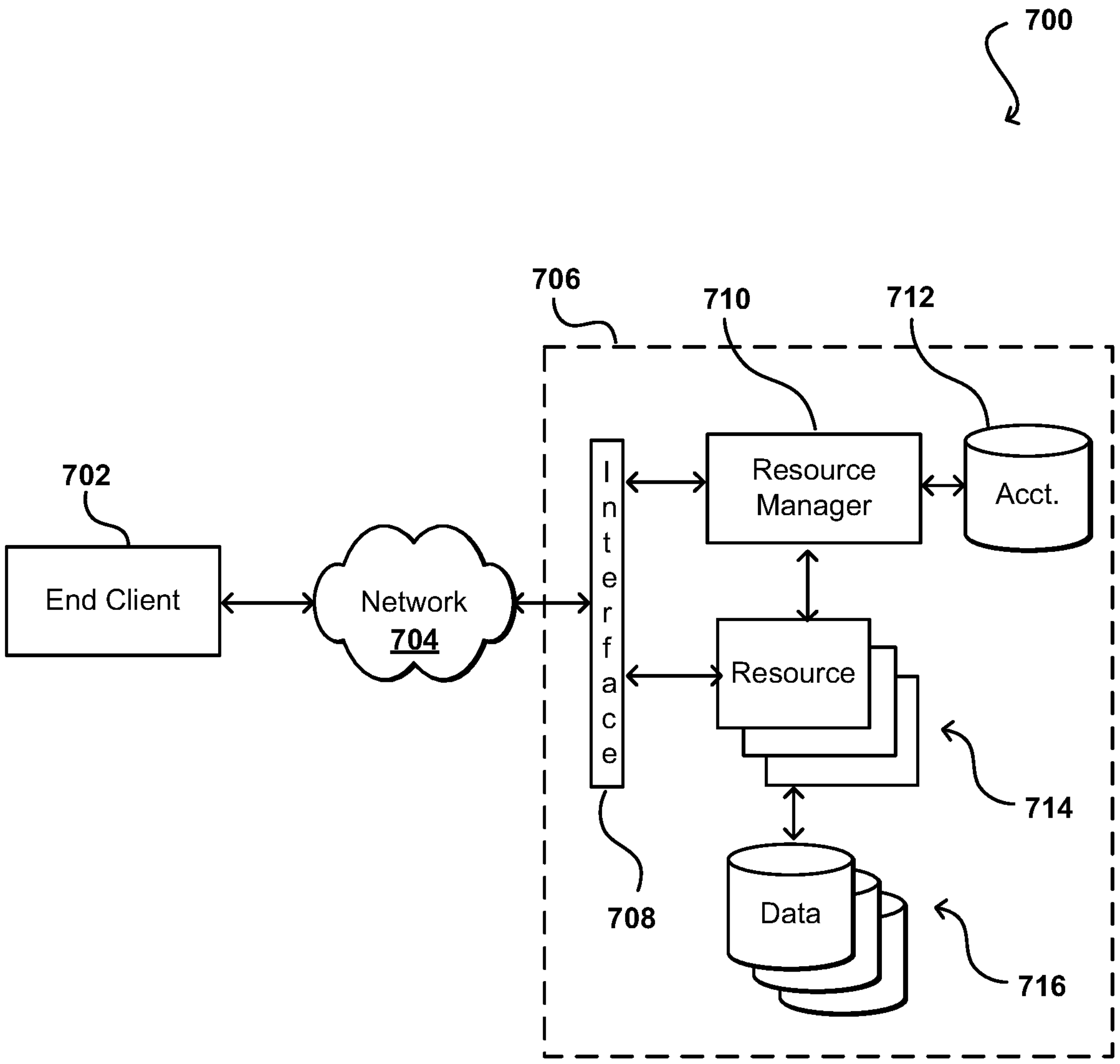
FIG. 7 illustrates an example network-inclusive computing environment in which aspects of various embodiments can be implemented.

FIG. 7 illustrates an example environment 700 in which aspect of various embodiments can be implemented. Such an environment can be used in some embodiments to provide resource capacity for one or more users, or customers of a resource provider, as part of a shared or multi-tenant resource environment. In this example a user is able to utilize a client device 702 to submit requests across at least one network 704 to a multi-tenant resource provider environment 706. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 706 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information.

The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 702 to communicate with an allocated resource without having to communicate with the resource manager 710, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
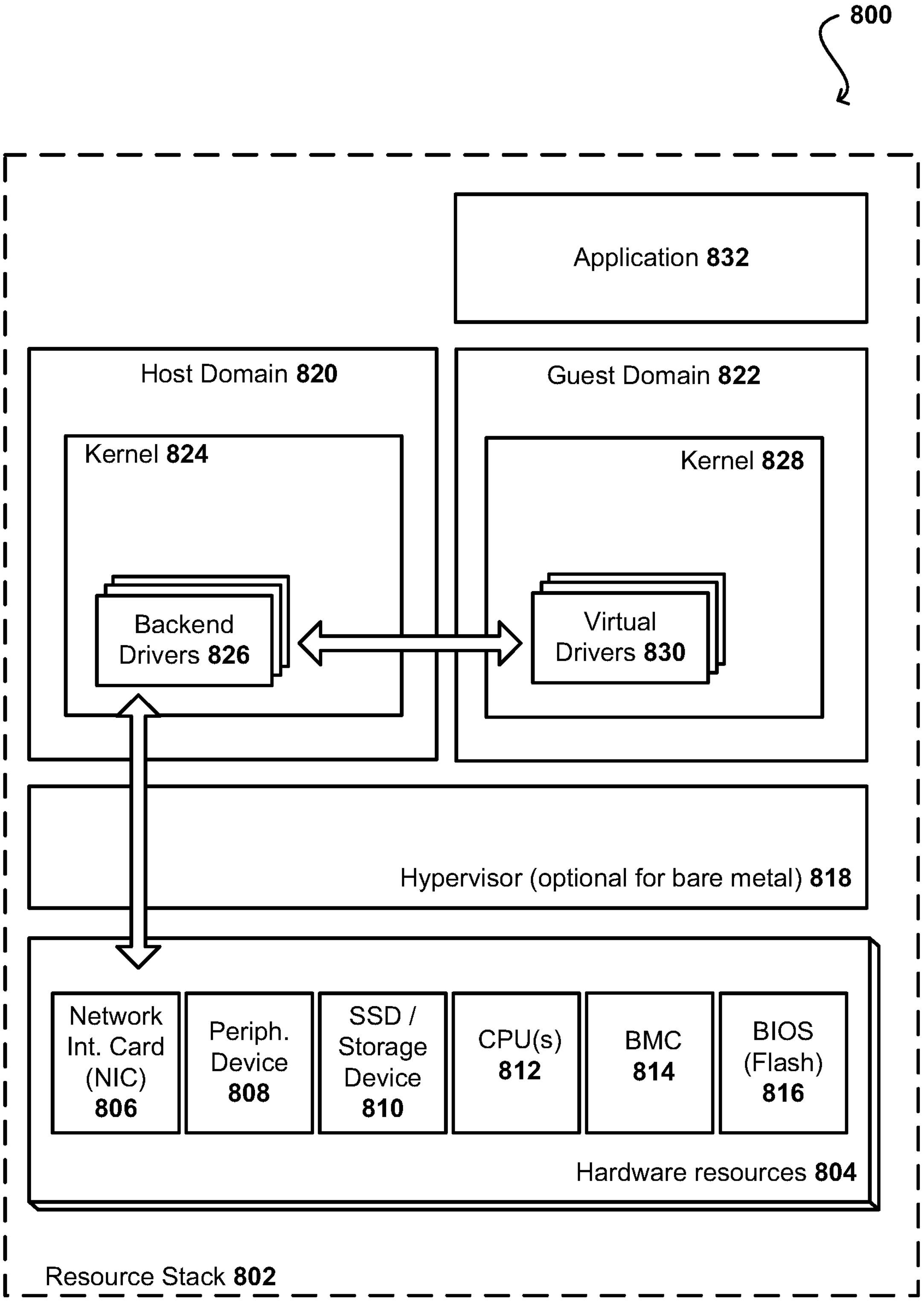
FIG. 8 illustrates example components of a server that can be utilized to perform at least a portion of a transcoding process, in accordance with various embodiments.

FIG. 8 illustrates an example resource stack 802 of a physical resource 800 that can be utilized in accordance with various embodiments. Such a resource stack 802 can be used to provide an allocated environment for a user (or customer of a resource provider) having an operating system provisioned on the resource. In accordance with the illustrated embodiment, the resource stack 802 includes a number of hardware resources 804, such as one or more central processing units (CPUs) 812; solid state drives (SSDs) or other storage devices 810; a network interface card (NIC) 806, one or more peripheral devices (e.g., a graphics processing unit (GPU), etc.) 808, a BIOS implemented in flash memory 816, and a baseboard management controller (BMC) 814, and the like. In some embodiments, the hardware resources 804 reside on a single computing device (e.g. chassis). In other embodiments, the hardware resources can reside on multiple devices, racks, chassis, and the like. Running on top of the hardware resources 804, a virtual resource stack may include a virtualization layer such as a hypervisor 818 for a Xen-based implementation, a host domain 820, and potentially also one or more guest domains 822 capable of executing at least one application 832. The hypervisor 818, if utilized for a virtualized environment, can manage execution of the one or more guest operating systems and allow multiple instances of different operating systems to share the underlying hardware resources 804. Conventionally, hypervisors are installed on server hardware, with the function of running guest operating systems, where the guest operating systems themselves act as servers.

In accordance with an embodiment, a hypervisor 818 can host a number of domains (e.g., virtual machines), such as the host domain 820 and one or more guest domains 822. In one embodiment, the host domain 820 (e.g., the Dom-0) is the first domain created and helps virtualize hardware resources and manage all of the other domains running on the hypervisor 818. For example, the host domain 820 can manage the creating, destroying, migrating, saving, or restoring the one or more guest domains 822 (e.g., the Dom-U). In accordance with various embodiments, the hypervisor 818 can control access to the hardware resources such as the CPU, input/output (I/O) memory, and hypervisor memory.

A guest domain 822 can include one or more virtualized or para-virtualized drivers 830 and the host domain can include one or more backend device drivers 826. When the operating system (OS) kernel 828 in the guest domain 822 wants to invoke an I/O operation, the virtualized driver 830 may perform the operation by way of communicating with the backend device driver 826 in the host domain 820. When the guest driver 830 wants to initiate an I/O operation (e.g., to send out a network packet), a guest kernel component can identify which physical memory buffer contains the packet (or other data) and the guest driver 830 can either copy the memory buffer to a temporary storage location in the kernel for performing I/O or obtain a set of pointers to the memory pages that contain the packet(s). In at least one embodiment, these locations or pointers are provided to the backend driver 826 of the host kernel 824 which can obtain access to the data and communicate it directly to the hardware device, such as the NIC 806 for sending the packet over the network.

It should be noted that the resource stack 802 illustrated in FIG. 8 is only one possible example of a set of resources that is capable of providing a virtualized computing environment and that the various embodiments described herein are not necessarily limited to this particular resource stack. In some embodiments, the guest domain 822 may have substantially native or "bare metal" access to the NIC 806 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 814 can maintain a list of events that have occurred in the system, referred to herein as a system event log (SEL). In at least one embodiment, the BMC 814 can receive system event logs from the BIOS 816 on the host processor. The BIOS 816 can provide data for system events over an appropriate interface, such as an $I^2C$ interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 818 can prevent the guest operating system, or guest domain 822, from sending such system event log data to the BMC 814. In the case of bare metal access without such a hypervisor, however, user instances can have the ability to send data for system event that spoof events from the BIOS 816. Such activity could lead to compromised bare metal instances being prematurely degraded due to fake system event data produced by the user OS.

In at least one embodiment, however, there will be portions of the physical resource 800 that will be inaccessible to the user OS. This can include, for example, at least a portion of BIOS memory 816. BIOS memory 816 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 816 at boot time, before a user OS is executing on the resource. Once the user OS is executing on the resource, that OS will be prevented from accessing that secret token in BIOS memory 816. In at least one embodiment, this secret token (or other stored secret) can be provided to the BMC 814 when adding system event log events, whereby the BMC 814 can confirm that the event is being sent by the BIOS 816 and not by the user OS.

Figure 9:
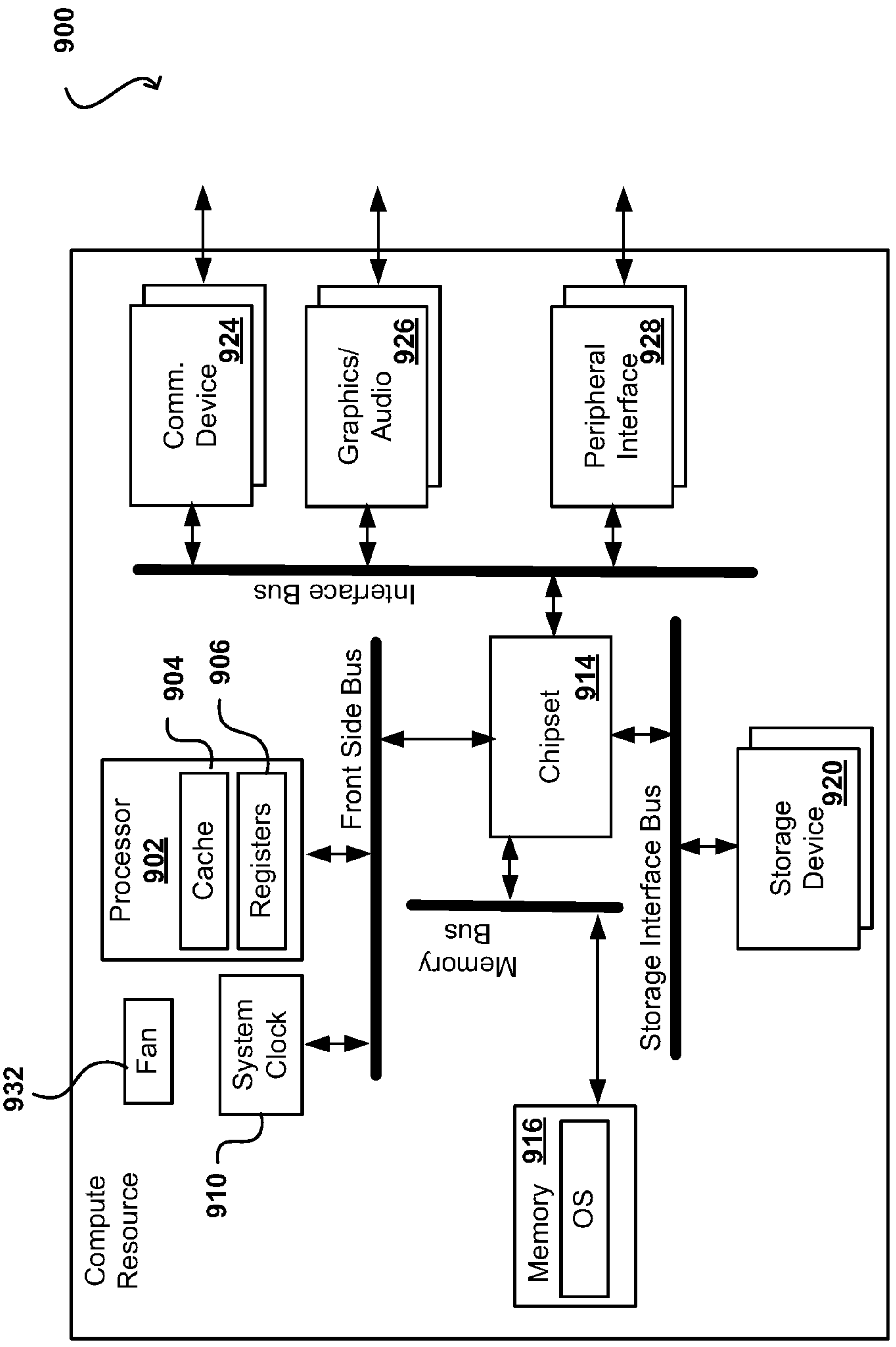
FIG. 9 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 9 illustrates components of an example computing resource 900 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 900 (e.g., a desktop or network server) will have one or more processors 902, such as central processing units (CPUs), graphics processing units (GPUs), and the like, that are electronically and/or communicatively coupled with various components using various buses, traces, and other such mechanisms. A processor 902 can include memory registers 906 and cache memory 904 for holding instructions, data, and the like. In this example, a chipset 914, which can include a northbridge and southbridge in some embodiments, can work with the various system buses to connect the processor 902 to components such as system memory 916, in the form or physical RAM or ROM, which can include the code for the operating system as well as various other instructions and data utilized for operation of the computing device. The computing device can also contain, or communicate with, one or more storage devices 920, such as hard drives, flash drives, optical storage, and the like, for persisting data and instructions similar, or in addition to, those stored in the processor and memory. The processor 902 can also communicate with various other components via the chipset 914 and an interface bus (or graphics bus, etc.), where those components can include communications devices 924 such as cellular modems or network cards, media components 926, such as graphics cards and audio components, and peripheral interfaces 928 for connecting peripheral devices, such as printers, keyboards, and the like. At least one cooling fan 932 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 902 can obtain data from physical memory 916, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 904 in at least some embodiments. The computing device 900 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 928, a communication device 924, a graphics or audio card 926, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 902 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle °, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:

generating, by a first secure token authority in a first region of a plurality of geographic regions, a unique identity for a resource instance in the first region, wherein the first secure token authority generates one or more unique identities for one or more resource instances in the first region and a second region of the plurality of geographic regions;

providing the unique identity to the resource instance, wherein the resource instance is authenticated using the unique identity;

initiating, by the first secure token authority, a transaction identified by a unique serial number to provide the unique identity to at least a second secure token authority in the second region;

issuing, using the first secure token authority in the first region or the second secure token authority in the second region, a certificate associated with the unique identity; and performing an authentication action on behalf of the resource instance using the certificate.

2. The method according to claim 1, wherein the first secure token authority is a certificate authority, and wherein the unique identity is generated using a cryptographic key associated with the resource instance.

3. The method according to claim 2, wherein the cryptographic key is stored redundantly in at least the first region and the second region.

4. The method according to claim 1, wherein the resource instance is an application container in the first region.

5. The method according to claim 1, further comprising:

receiving, by the second secure token authority in the second region, a request to initiate a secure communication between the first resource instance in the first region and a second resource instance in the second region;

authenticating, using a second certificate issued by the second secure token authority, the first resource instance using the unique identity stored redundantly in the second region; and storing information for the secure communication to a log in the second region that is available from the first region.

6. The method according to claim 1, further comprising: sending the unique identity from the first region to the secure token authority in the second region using the transaction with the unique serial number dependent, at least in part, upon the first region from which the transaction was initiated, wherein the transaction serial number will be unique both within and across regions.

7. The method according to claim 1, further comprising: providing an interface to allow a user to specify one or more regions for which the unique identity is to be redundantly stored.

8. The method according to claim 1, wherein the first secure token authority and the second secure token authority operate independently as part of a multi-primary system, and are able to use the unique identity to perform one or more secure tasks in the first region and the second region.

9. The method according to claim 1, wherein the second secure token authority is able to revoke the certificate whether the certificate is issued by the first secure token authority or the second secure token authority.

10. A system, comprising:

a processor; and memory including instructions that, when executed by the processor, cause the system to:

generate, by a first secure token authority in a first region of a plurality of geographic regions, a unique identity for a resource instance in the first region, wherein the first secure token authority generates one or more unique identities for one or more resource instances in the first region and a second region of the plurality of geographic regions;

provide the unique identity to the resource instance, wherein the resource instance is authenticated using the unique identity;

initiate, by the first secure token authority, a transaction identified by a unique serial number to provide the unique identity to at least a second secure token authority in the second region;

issue, using the first secure token authority in the first region, a certificate corresponding to the unique identity; and revoke the certificate using the first secure token authority or the second secure token authority in the second region.

11. The system according to claim 10, wherein the instructions when executed further cause the system to:

receive, by the second secure token authority in the second region, a request to initiate a secure communication between the first resource instance in the first region and a second resource instance in the second region;

authenticate, using a certificate issued by the second secure token authority, the first resource instance using the unique identity stored redundantly in the second region; and write information for the secure communication to a log in the second region that is available from the first region.

12. The system according to claim 11, wherein the resource instance is an application container in the first region.

13. The system according to claim 11, wherein the instructions when executed further cause the system to:

send the unique identity from the first region to the secure token authority in the second region using the transaction with the unique serial number dependent, at least in part, upon the first region from which the transaction was initiated, wherein transaction serial numbers will be unique both within and across regions.

14. The system according to claim 10, wherein the first secure token authority is a certificate authority, and wherein the unique identity is generated using a cryptographic key associated with the resource instance.

15. The system according to claim 14, wherein the cryptographic key is stored redundantly in at least the first region and the second region.

16. A non-transitory computer-readable storage medium storing instructions that, when executed by a processor of a computing device, cause the computing device to:

generate, by a first secure token authority in a first region of a plurality of geographic regions, a unique identity for a resource instance in the first region, wherein the first secure token authority generates one or more unique identities for one or more resource instances in the first region and a second region of the plurality of geographic regions;

provide the unique identity to the resource instance, wherein the resource instance is authenticated using the unique identity;

initiate, by the first secure token authority, a transaction identified by a unique serial number to provide the unique identity to at least a second secure token authority in the second region;

issue, using the first secure token authority in the first region, a certificate corresponding to the unique identity; and revoke the certificate using the first secure token authority or the second secure token authority in the second region.

17. The non-transitory computer-readable storage medium of claim 16, wherein the instructions when executed further cause the computing device to:

receive, by the second secure token authority in the second region, a request to initiate a secure communication between the first resource instance in the first region and a second resource instance in the second region;

authenticate, using a certificate issued by the second secure token authority, the first resource instance using the unique identity stored redundantly in the second region; and write information for the secure communication to a log in the second region that is available from the first region.

18. The non-transitory computer-readable storage medium of claim 17, wherein the instructions when executed further cause the computing device to:

send the unique identity from the first region to the secure token authority in the second region using the transaction with the unique serial number dependent, at least in part, upon the first region from which the transaction was initiated, wherein transaction serial numbers will be unique both within and across regions.

19. The non-transitory computer-readable storage medium of claim 16, wherein the first secure token authority is a certificate authority, and wherein the unique identity is generated using a cryptographic key associated with the resource instance.

20. The non-transitory computer-readable storage medium of claim 19, wherein the cryptographic key is stored redundantly in at least the first region and the second region.

* * * * *